United States Patent [19]

Grandchamp

[11] 3,914,999

[45] Oct. 28, 1975

[54] METHOD AND APPARATUS FOR THE ULTRASONIC MEASUREMENT OF FLOW VELOCITY

[75] Inventor: Pierre-André Grandchamp, Arlesheim, Switzerland

[73] Assignee: Hoffmann-La Roche Inc., Nutley, N.J.

[22] Filed: Feb. 7, 1974

[21] Appl. No.: 440,430

[30] Foreign Application Priority Data
Feb. 16, 1973 Switzerland.......................... 2332/73
Dec. 12, 1973 Switzerland....................... 17401/73

[52] U.S. Cl............................ 73/194 A; 128/2.05 F
[51] Int. Cl.²......................................... G01F 1/66
[58] Field of Search ...... 73/194 A, 339 A; 340/3 D, 340/5 S; 128/2.05 F

[56] References Cited
UNITED STATES PATENTS

| | | | |
|---|---|---|---|
| 3,514,747 | 5/1970 | Lynnworth et al. | 73/339 A X |
| 3,550,070 | 12/1970 | McLeod, Jr. | 73/194 A X |
| 3,554,030 | 1/1971 | Peronneau | 73/194 A |
| 3,636,754 | 1/1972 | Lynnworth et al. | 73/194 A X |

*Primary Examiner*—Charles A. Ruehl
*Attorney, Agent, or Firm*—Samuel L. Welt; Bernard S. Leon; Mark L. Hopkins

[57] ABSTRACT

A method and apparatus are disclosed, with which a velocity profile of a flowing fluid can be determined. The flowing fluid is irradiated with pulsed ultrasonic waves and the velocity information for each point of the velocity profile is obtained by measuring the difference between the transit times of reflected waves which are produced by different transmitted pulses and have substantially the same transit time.

27 Claims, 16 Drawing Figures

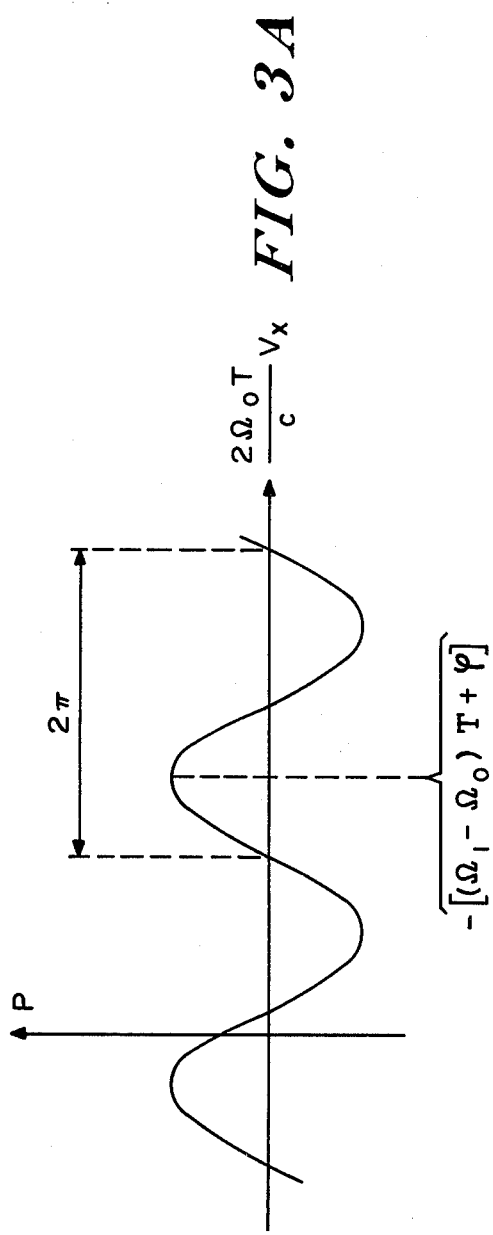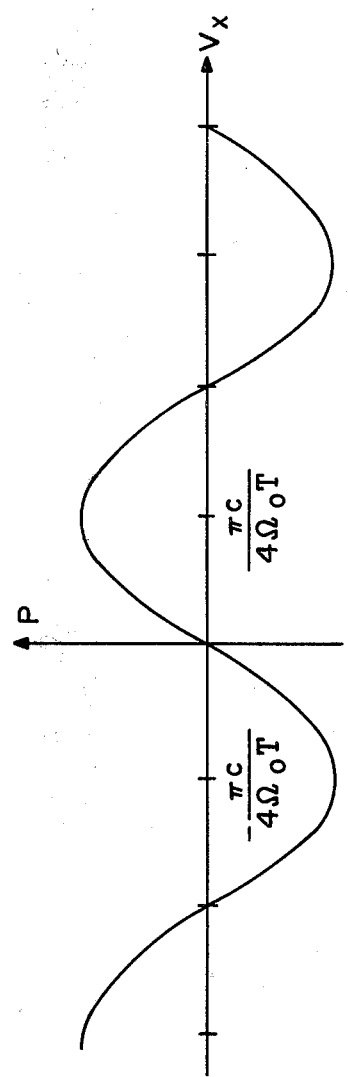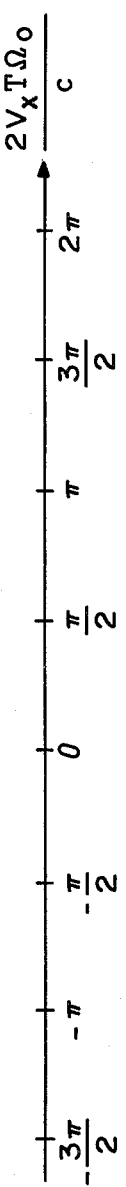

3,914,999

METHOD AND APPARATUS FOR THE ULTRASONIC MEASUREMENT OF FLOW VELOCITY

BACKGROUND OF THE INVENTION

This invention relates to a method of measuring a velocity profile for a flowing fluid (e.g. a liquid such as blood or a gas such as air), in which method the fluid is irradiated with pulsed waves and echo signals are derived from the reflected waves received from the fluid. The invention also concerns apparatus for performing the method.

Ultrasonic Doppler methods have for several years been used to measure rates of flow. The basic principle of these methods is as follows:

Ultrasonic waves are directed onto a moving fluid and the waves reflected from scattering centres are received by an untrasonic transducer. If the liquid moves, the received waves have a frequency which differs from the transmitted frequency. The value of the frequency displacement or "Doppler" frequency shift is proportional to the speed of the fluid, so that the rate of flow can be determined by measuring the Doppler frequency shift.

In the simplest Doppler flow meters, a continuous ultrasonic wave is transmitted by an ultrasonic transducer and the reflected signal is received by a second transducer (e.g. P. N. T. Wells, "Physical Principles of Ultrasonic Diagnosis", Academic Press, London, New York 1969, pp. 193–209).

A spectrum of Doppler frequency shifts is obtained, representing different values of the point velocity of the fluid along the ultrasonic beam. In this process, the information about the spatial distribution of the point velocities is lost.

In a more developed device (e.g. P. Peronneau, J. Hinglais, M. Pellet & F. Léger: "Vélocimètre sanguin par effet Doppler à émission ultrasonore pulsée", ["Doppler-effect blood flow meter with pulsed ultrasonic emission"], L'Onde Electrique, Volume 50, Part 5, 369–389, May 1970), a pulsed ultrasonic wave is used. The reflected wave is observed for only a short time at a particular instant after transmitting the pulse. Consequently, the echo is observed from one point at a given distance from the ultrasonic transducer and the velocity is obtained at a given point in the fluid.

Frequently, however, it is important to know a velocity profile, i.e. the velocity as a function of the distance from the transducer. A velocity profile can be measured with the last-mentioned device, but the process is very time-consuming, since the profile has to be measured point by point.

In a modified form of the last-mentioned device (e.g. F. D. McLeod, M. Anliker, "A Multiple Gate Pulse Doppler Flowmeter", 1971 IEEE Ultrasonics Symposium, Miami Beach, Florida), $n$ parallel channels are used on the receiver side, thus obtaining a velocity profile with $n$ velocity values. A device of this kind, of course, is very complex if the velocity profile needs to be resolved into a reasonable number of points, e.g. 10–20 values.

A common feature of all the methods described so far is that the Doppler frequency is obtained by mixing the received signal with a signal of the transmitted frequency which is obtained from the transmitting oscillator.

SUMMARY OF THE INVENTION

The invention, on the other hand, has as a principal object the task of providing a method which makes possible the rapid determination of a velocity profile with a small expenditure on apparatus.

According to the broader aspects of the invention there is provided a method of measuring a velocity profile for a flowing fluid by irradiating the fluid with pulsed waves and deriving echo signals from the reflected waves received from the fluid, which method is characterized in that the velocity at each point on the velocity profile is determined by measuring at least one difference in the transit time of reflected waves which are produced by different transmitted pulses and which have substantially the same transit time.

Also according to the broader aspects of the invention there is provided an apparatus for measuring a velocity profile for a flowing fluid, including a transmitter for irradiating the fluid with pulsed waves a receiver for receiving reflected waves from the fluid and delivering echo signals derived therefrom, which apparatus is characterized by measurement means for measuring the difference in transit time between reflected waves produced by different transmitted pulses and having substantially the same transit time.

BRIEF DESCRIPTION OF THE DRAWINGS

The above-mentioned and other aspects and features of the invention will become better understood by reference to the detailed description provided herein taken in conjunction with the accompanying drawings, in which:

FIG. 3A is a waveform diagram illustrating, in its general form, the output signal of the apparatus of FIG. 1;

FIG. 3B is a waveform diagram exhibiting a special case of the function exhibited in FIG. 3A;

DESCRIPTION OF THE PREFERRED EMBODIMENTS

Figure 1:
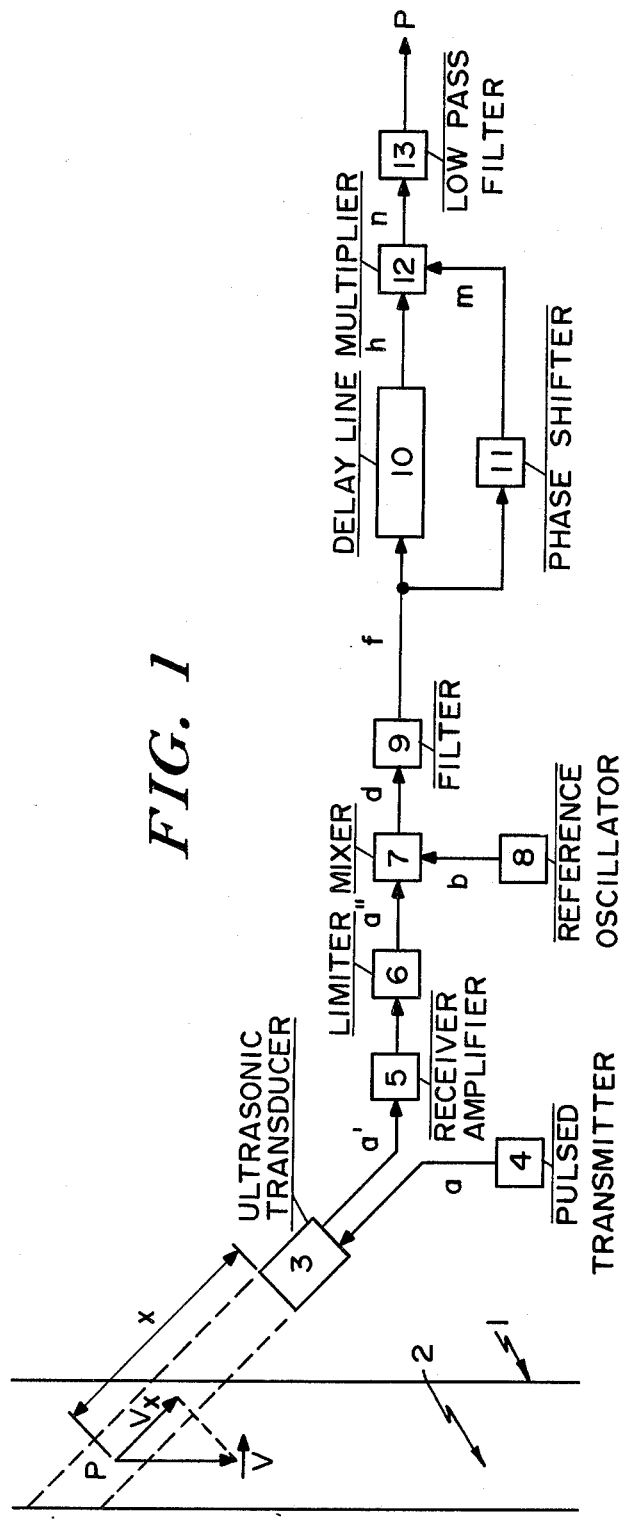
FIG. 1 is a block diagram of an arrangement for carrying out the process in accordance with the invention.

The measuring apparatus illustrated in FIG. 1 is used to determine a velocity profile of a fluid 2 flowing through a tube 1.

The apparatus comprises a receiving and transmitting ultrasonic transducer 3 which is conveniently situated for irradiating the fluid and is connected to the output of a pulsed transmitter 4 and to the input of an amplifier 5. A mixer 7 is connected to the output of a reference oscillator 8 and to the output of amplifier 5 via a signal limiter 6. A filter 9 connects the output of mixer 7 to the inputs of a delay line 10 and a phase shifter 11. A multiplier 12 is connected to the outputs of elements 10 and 11 and to the input of a low-pass filter 13.

Figure 2A:
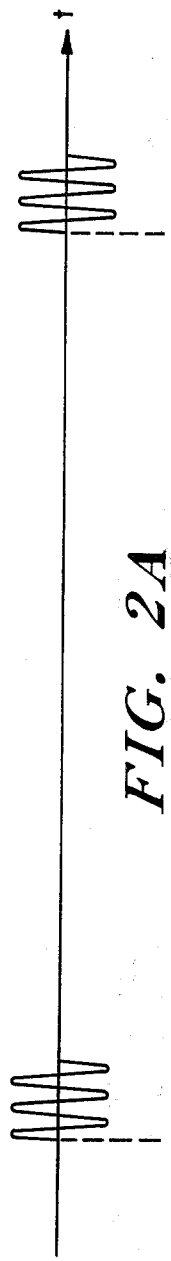
FIGS. 2A and 2B illustrate diagrams exhibiting respectively the transmitted signals and the echo signals associated with the arrangement of FIG. 1.

The measuring apparatus operates as follows:

The pulsed transmitter 4 (FIG. 1) excites the ultrasonic transducer 3 with a signal $a$ consisting of short pulses having an angular frequency $\Omega_0$. The repetition period of these pulses is T and the transmitted signal $a$ is shown in FIG. 2a. The ultrasonic transducer transmits an ultrasonic pulse with propogates in fluid 2 at a velocity $c$. Point P in FIG. 1 represents a scattering centre in the sound-scattering fluid, $\vec{V}$ represents the velocity of point P and $Vx$ is the component of this velocity parallel to the direction of sound propogation. The distance between the point P and the transducer 3 is $x$.

The electrical signal applied to the transducer 3 during the transmission phase is a short pulse having an angular frequency $\Omega_0$. During the time when this pulse is transmitted, the signal $a$ can be written as follows:

$$a = a_0 \sin\Omega_0 t \tag{1}$$

with $a_0 =$ amplitude of the signals.

The ultrasonic transducer receives the following echo signal from the point P in the sound-scattering fluid:

$$a' = a'_0 \sin\Omega_0(t-\tau) \tag{2}$$

Figure 2B:
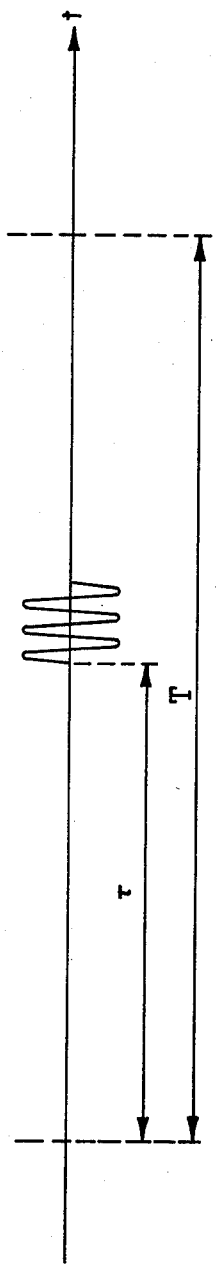

This signal is shown in FIG. 2b; the delay $\tau$ is the transit time of the sound pulse along the distance from the transducer to point P and back. This transit time is given by:

$$\tau = \frac{2x}{c} \tag{3}$$

If point P moves, the transit $\tau$ is dependent on time. Its derivative with respect to time can be written as follows:

$$\frac{d\tau}{dt} = \frac{2 Vx}{c} \tag{4}$$

The echo signal $a'$ is then amplified by amplifier 5 and limited by limiter 6 in FIG. 1.

The phase shift of amplifier 5 and limiter 6 should be independent of the amplitude of the input signal. In the following calculations it is assumed that this phase shift is zero; this assumption does not limit the validity of the results. It is also assumed that the amplitude of the signal $a''$ delivered by the limiter is equal to unity. We then have:

$$a'' = \sin\Omega_0(t-\tau) \tag{5}$$

The reference oscillator 8 delivers a reference signal $b$ having an angular frequency $\Omega_1$:

$$b = \sin\Omega_1 t \tag{6}$$

In this case also it is advantageous in calculation to make the amplitude of signal $b$ equal to unity. The assumption that the amplitude of signals $a''$ and $b$ is equal to unity, does not limit the validity of the results.

Signals $a''$ and $b$ are first mixed in mixer 7. The following signal is obtained at the output of the mixing stage:

$$a'' \cdot b = d = \sin\Omega_0(t-\tau) \cdot \sin\Omega_1 t \tag{7}$$

or $$d = \tfrac{1}{2}[\cos(\Omega_0 t - \Omega_0\tau - \Omega_1 t) - \cos(\Omega_0 t - \Omega_0\tau + \Omega_1 t)] \tag{8}$$

This signal $d$ contains two frequency bands. Filter 9 transmits only one of them, e.g. the lower band, in which case a signal $f$ is obtained at the filter output as follows:

$$f = \tfrac{1}{2}\cos(\Omega_0 t - \Omega_1 t - \Omega_0\tau) \tag{9}$$

The signal $f$ is applied to the input of the delay line 10. The delay time of line 10 is equal to the pulse repetition period T of the pulsed transmitter. Consequently, a delayed signal $h$ is obtained at the output of the delay line as follows:

$$h = \tfrac{1}{2}\cos[\Omega_0(t-T) - \Omega_1(t-T) - \Omega_0\tau_{t-T}] \tag{10}$$

The notation $\tau_t$, respectively $\tau_{t-T}$ is used to express the time dependency of $\tau$.

Signal $f$ is also phase-shifted by $\phi$ in a phase-shifter 11. The phase-shifter therefore delivers a signal $m$:

$$m = \tfrac{1}{2}\cos[\Omega_0 t - \Omega_1 t - \Omega_0\tau - \phi] \tag{11}$$

Signals $h$ and $m$ are formed in the same manner for all incoming echo signals and the signal $h$ corresponding to a given transmitted pulse is multiplied in multiplier 12 by a signal $m$ corresponding to the next transmitted pulse.

Accordingly, the following product is obtained at the multiplier output:

$$h \cdot m = n \tag{12}$$

and $$n = \tfrac{1}{8}\{\cos[(\Omega_1-\Omega_0)T+\Omega_0(\tau_t - \tau_{t-T}) + \phi] + \cos[2(\Omega_0-\Omega_1)t + (\Omega_1-\Omega_0)T - \Omega_0(\tau_t + \tau_{t-T}) - \phi]\} \tag{13}$$

The low-pass filter 13 eliminates the upper frequency band of signal $n$. If the factor $\tfrac{1}{8}$ is disregarded the following signal $p$ is obtained at the low-pass filter output, wherein the transit time is the only time-dependent variable.

$$p = \cos[(\Omega_1-\Omega_0)T + \Omega_0(\tau_t - \tau_{t-T}) + \phi] \tag{14}$$

If the motion of P is uniform, we can write:

$$\tau_{t-T} = \tau_t - \frac{d\tau_t}{dt} \cdot T$$

Therefore, from equation (4):

$$\tau_{t-T} = \tau_t - \frac{2 Vx}{c} \cdot T$$

We can also write, from equations (14) and (16):

$$P = \cos\left\{\left[(\Omega_1-\Omega_0)T+\phi\right] + \frac{2\Omega_o T}{c}Vx\right\} \quad (17)$$

Equation (17) is illustrated in FIG. 3a.

It can be seen from equation (17) that the signal $p$ represents a sinusoidal function of the velocity of the point P of the soundscattering fluid. If the parameters $\Omega_0$, $\Omega_1$, T and $\phi$ are selected so that the condition $$-[(\Omega_1-\Omega_0)T+\phi] = \pm\pi/2 + 2K\pi \quad (18)$$

with $K$ = an integer $\lessgtr 0$
is fulfilled, we then obtain, from (17) and (18):

$$p = \pm \sin\frac{2\Omega_o T}{c}Vx \quad (19)$$

FIG. 3b represents equation (19) when condition (18) is satisfied with a positive sign. FIG. 3b shows that the measuring apparatus in FIG. 1 can operate as a flowmeter sensitive to the direction of flow, the measurement having a single value only for the following velocities:

$$|Vx| \leq \frac{\pi c}{4\Omega_o T} \quad (20)$$

The following are typical values of $c$, $\Omega_0$ and T when velocity profiles are measured in arteries:

$c \approx 1500$ m/s
$\Omega_0 \approx 2$–20 MHz
$T \approx$ from approx. 10 $\mu$s to a few 100 $\mu$s In the method of operation described, the signal conveying the information regarding velocity is obtained by forming the product of two other signals. Accordingly, this method, and methods derived therefrom, will for short be called "multiplicative methods".

Up to now, we have discussed the calculation of the velocity of a single point P. However, this method makes it possible to obtain a complete velocity profile of the flowing fluid, since the delay line, according to its storage capacity, stores information corresponding to a plurality of reflecting points like P, which are distributed along the sound ray. For example, a complete velocity profile can be visualized by displaying the amplitude vs. time development of signal P on the screen of a cathode-ray oscillograph.

Allowing for the condition (18) and using suitable values of $\Omega_o$, $\Omega_l$, T and $\phi$, we can construct various embodiments of the basic measuring apparatus of FIG. 1. If, for example $$(\Omega_1-\Omega_0)\ T = \pm\ \pi/2 + 2K\ \pi\ and\ \phi = 0, \quad (21)$$

a phase shifter is not needed.
An alternative possibility is e.g.:

$$(\Omega_1-\Omega_0)\ T = 2\ k\ \pi\ and\ \phi = \pm\ \pi/2 \quad (25)$$

It is also possible to operate without an intermediate frequency ($\Omega_1 = 0$), in which case reference oscillator 8, mixer 7 and filter 9 can be omitted. In this case, condition (18) will be written as follows:

$$(-\Omega_o T+\phi) = \pm\ \pi/2 + 2\ k\ \pi \quad (26)$$

All the previously mentioned embodiments of the measuring apparatus of FIG. 1 remain valid for $\Omega_1 = 0$.

The phase-shifter 11 in FIG. 1 can also be disposed at other suitable places, e.g. in front of or behind the delay line 10.

Figure 4:
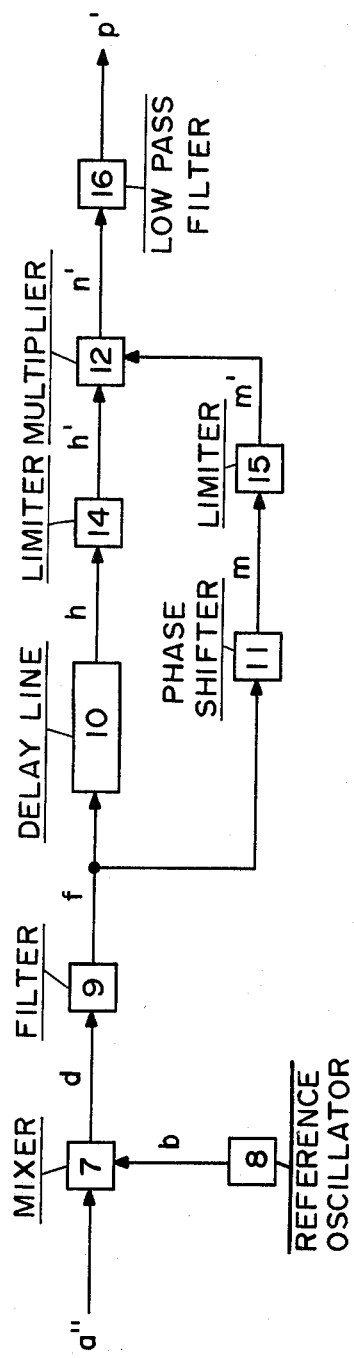
FIG. 4 is a block diagram of a first variant of the arrangement exhibited in FIG. 1.
Figure 5:
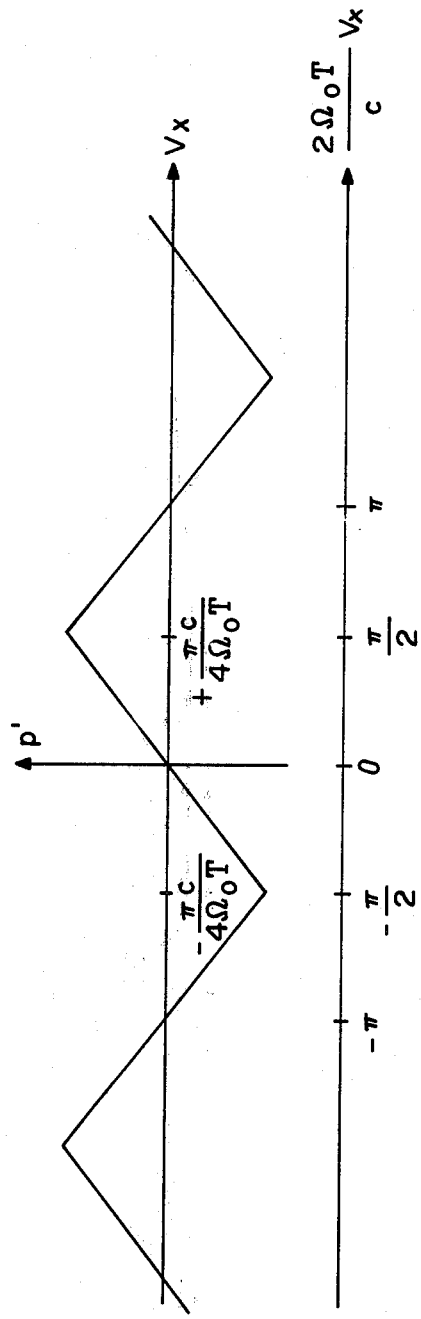
FIG. 5 is a waveform diagram exhibiting a particular case of the function describing the output signal of the arrangement of FIG. 5.

An important modification of the measuring apparatus FIG. 1 is shown in FIG. 4. In this modification, signals $h$ and $m$ are limited by two limiters 14 and 15, so that the multiplier 12 receives square signals $h'$ and $m'$ instead of the sinusoidal signals $h$ and $m$. It can be proved that the output signal $p'$ at the output of the low-pass filter 16 is a triangular function of Vx. This function is shown in FIG. 5 for the case when condition (18) is fulfilled. It can be seen that, in this case, the output signal $p'$ is substantially a linear function of Vx in the region defined by (20).

A number of changes can be made in the apparatus of FIG. 4. For example limiters 14 and 15 can be disposed in front of or behind the delay line 10 or in front of or behind the phase-shifter 11.

Figure 6:
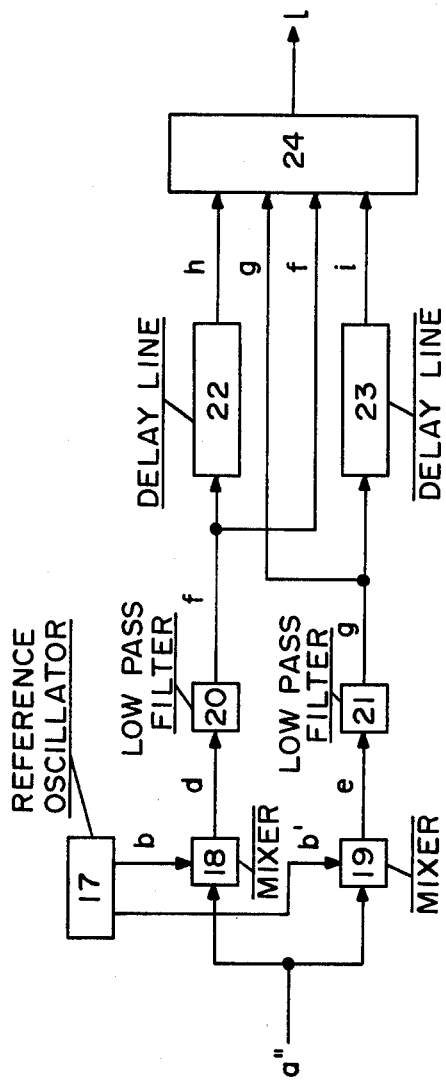
FIG. 6 is a block diagram of a second variant of the arrangement exhibited in FIG. 1.

FIG. 6 shows another modification of the measuring device of FIG. 1. In FIG. 6, the phase-shift is obtained by using two reference signals $b$ and $b'$ from a reference oscillator 17. These signals must have the same frequency and must have a phase shift $\phi$ relative to one another.

An interesting embodiment of the FIG. 6 apparatus is obtained if $b$ and $b'$ have the angular frequency $\Omega_0$ and a phase shift of $\pi/2$ relative to one another. In this case, therefore, the reference oscillator 17 delivers two signals:

$$\begin{aligned}b &= \sin\Omega_0 t\\ b' &= \cos\Omega_0 t\end{aligned} \quad (27)$$

As before, it is advantageous in calculation to make the amplitudes equal to unity. We shall first describe the method of operation of the apparatus shown in FIG. 6.

Signal $a''$ is multiplied by $b$ and $b'$ in mixers 18 and 19 respectively. The following signals $d$ and $e$ appear at the outputs of these mixers:

$$\begin{aligned}d &= a''\cdot b = \sin\Omega_0(t-\tau)\cdot\sin\Omega_0 t = \tfrac{1}{2}\cos\Omega_0\tau - \tfrac{1}{2}\cos(2\Omega_0 t-\Omega_0\tau)\\ e &= a''\cdot b' = \sin\Omega_0(t-\tau)\cdot\cos\Omega_0 t = \tfrac{1}{2}\sin\Omega_0\tau + \tfrac{1}{2}\sin(2\Omega_0 t-\Omega_0\tau)\end{aligned} \quad (28)$$

These signals are then filtered through low-pass filters 20 and 21, the frequency band around $2\Omega_0$ is cut out and only the following signals are transmitted:

$$\begin{aligned}f &= \tfrac{1}{2}\cos\Omega_0\tau_t\\ g &= \tfrac{1}{2}\sin\Omega_0\tau_t\end{aligned} \quad (29)$$

The notation $\tau_t$ expresses the time dependence of the transit time $\tau$.

The two signals $f$ and $g$ appearing respectively at the outputs of filters 20 and 21 are then delayed by respective delay lines 22 and 23. As before, the delay time is equal to the pulse repetition period T of the transmitter. The following signals appear at the delay-line outputs:

$$\begin{aligned}h &= \tfrac{1}{2}\cos\Omega_0\tau_{t-T}\\ i &= \tfrac{1}{2}\sin\Omega_0\tau_{t-T}\end{aligned} \quad (30)$$

By substituting $\tau_{t-T}$ from equation (16) in equation (30) we obtain:

$$\begin{aligned}h &= 1/2\ \cos\Omega_o\left[\tau_t - \frac{2Vx}{c} - T\right] = 1/2\cos\left(\Omega_o\tau_t - \frac{2\Omega_o T}{c}Vx\right)\\ i &= 1/2\ \sin\Omega_o\left[\tau_t - \frac{2Vx}{c} - T\right] = 1/2\sin\left(\Omega_o\tau_t - \frac{2\Omega_o T}{c}Vx\right)\end{aligned} \quad (31)$$

Signals $f$ and $g$ can be regarded as the components of a vector $\vec{D}$. In that case, $h$ and $i$ will be the components of the same vector $\vec{D}$, but $T$ seconds previously, i.e.:

$$\vec{D}(t) = (f,g)$$
$$\vec{D}(t-T) = (h,i) \quad (32)$$

Figure 8:
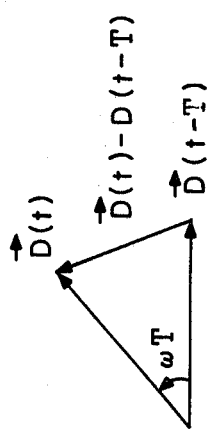
FIG. 8 is a vector diagram exhibiting a vector, $\vec{D}(t)$, whose rotation per unit time is related to the point velocity $Vx$.

These vectors are shown in FIG. 8. The change in the vector from pulse to pulse can be regarded as a rotation of the vector. The rotation occurs at an angular frequency $\omega$, where:

$$\omega = \frac{2\Omega_o}{c} V_x \quad (33)$$

The angular frequency $\omega$ is therefore proportional to the point velocity $V_x$. $\omega$ and consequently $V_x$ can be determined by a computer unit 24 in various forms. For example, the magnitude and direction of the velocity can be determined by forming the vector product $$\vec{P} = \vec{D}(t) \times \vec{D}(t-T) \quad (34)$$

Let $|\vec{P}|$ be the projection of $\vec{P}$ on to an axis parallel to the vector $\vec{P}$. We then have:

$$\vec{P} = \vec{D}(t) \times \vec{D}(t-T) = (f,g) \times (h,i) \quad (35)$$

and $$|\vec{P}| = fi - gh \quad (36)$$

according to the known rules for calculating vector products. The intermediate products are:

$$k = fi = -\tfrac{1}{4} \cos(\Omega_o T_t) \cdot \sin\left(\Omega_o T_t - \frac{2V_x}{c} T\Omega_o\right) = \quad (37)$$

$$= -\tfrac{1}{8}\left[\sin\frac{-2v_x T\Omega_o}{c} + \sin 2\Omega_o T_t - \left(\frac{2V_x \Omega_o T_t}{c}\right)\right]$$

$$j = hg = -\tfrac{1}{4} \cos\left(\Omega_o T_t - \frac{2V_x}{c} T\Omega_o\right) \cdot \sin \Omega_o T_t = \quad (38)$$

$$= -\tfrac{1}{8}\left[\sin\frac{2v_x T\Omega_o}{c} + \sin\left(\Omega_o T_t - \frac{2v_x T\Omega_o}{c}\right)\right]$$

In this case, the following signal is obtained at the output of computer unit 24:

$$l = |\vec{P}| = k-j = fi - hg = \tfrac{1}{4} \sin\left(\frac{2\Omega_o T}{c} V_x\right) \quad (39)$$

or $$l \alpha \sin\left(\frac{2\Omega_o T}{c} V_x\right) \quad (40)$$

It is clear from this equation that the method can be used to calculate the magnitude and direction of the point velocities of a velocity profile.

The diagram in FIG. 3B also represents the function in accordance with equation (40).

The algebraic length $|\vec{P}|$ of $\vec{P}$ can also be obtained by forming the scalar product $$\vec{D}(t) \cdot \vec{E}(t-T) \quad (41)$$

if the vector $\vec{E}$ is defined as $$\vec{E}(t-T) = (i, -h) \quad (42)$$

We have:

$$D(t) \cdot E(t-T) = (f,g) \cdot (i,-h) = fi - hg = |\vec{P}| \quad (43)$$

The magnitude and direction of the velocity can also be calculated separately. For example, the magnitude can be calculated from the equation:

$$|\vec{D}(t) - \vec{D}(t-T)| = 2|\vec{D}| \cdot \left|\sin\frac{\omega T}{2}\right| = 2|\vec{D}| \cdot \left|\sin\frac{\Omega_o T}{c} V_x\right| \quad (44)$$

since the amplitude of the difference vector $[\vec{D}(t) - \vec{D}(t-T)]$ is proportional to the angle $\omega T$, provided $\omega T$ is sufficiently small.

Figure 9:
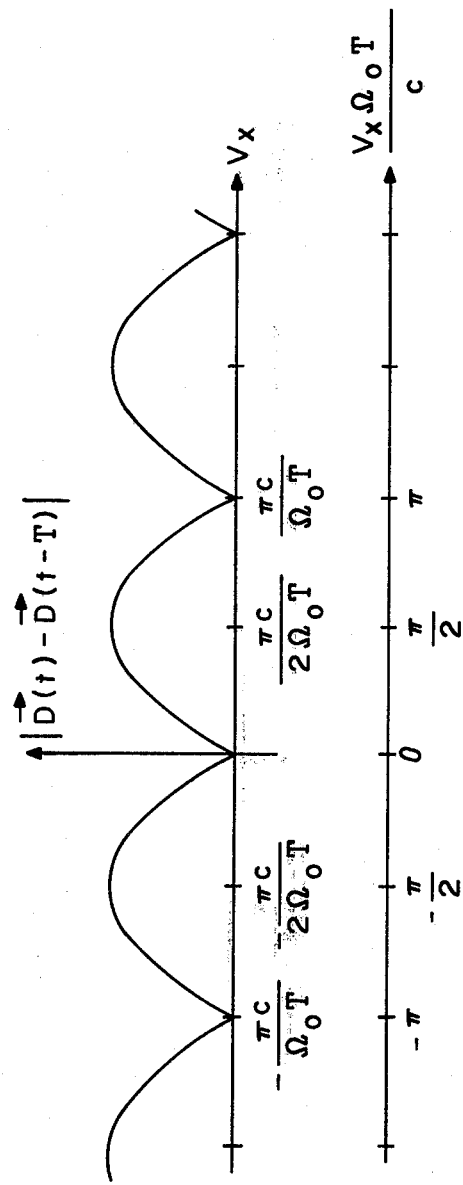
FIG. 9 is a waveform diagram exhibiting the function $|\vec{D}(t) - \vec{D}(t-T)|$.

The direction (or sign) of the velocity can be obtained e.g. by forming a vector product or by using a direction comparator, which can compare the direction of $[\vec{D}(t) - \vec{D}(t-T)]$ with the direction of $\vec{D}(t)$ or $\vec{D}(t-T)$ or $[\vec{D}(t) + \vec{D}(t-T)]$. FIG. 9 shows $|\vec{D}(t) - \vec{D}(t-T)|$ as a function of $V_x$. As can be seen, the measurement of the magnitude of the velocity gives a single value only for the following magnitudes:

$$|V_x| \leq \frac{\pi c}{2\Omega_o T} \quad (45)$$

The reference frequency (or frequency of the signal from oscillator 17) in the device in FIG. 6 may also be different from the tranmitted frequency $\Omega_o$. If the reference frequency is $(\Omega_o + \Delta\Omega)$, it can be shown that the method in accordance with equation (44) (calculation of the magnitude) gives the following output signal:

$$l = \sqrt{(f-h)^2 + (g-i)^2} = \left|\sin\left(\frac{\Delta\Omega T}{2} + \frac{\Omega_o T}{c} V_x\right)\right| \quad (46)$$

At a velocity $V_x = 0$, this method gives an output signal $$l = \left|\sin\frac{\Delta\Omega T}{2}\right|.$$

Figure 10:
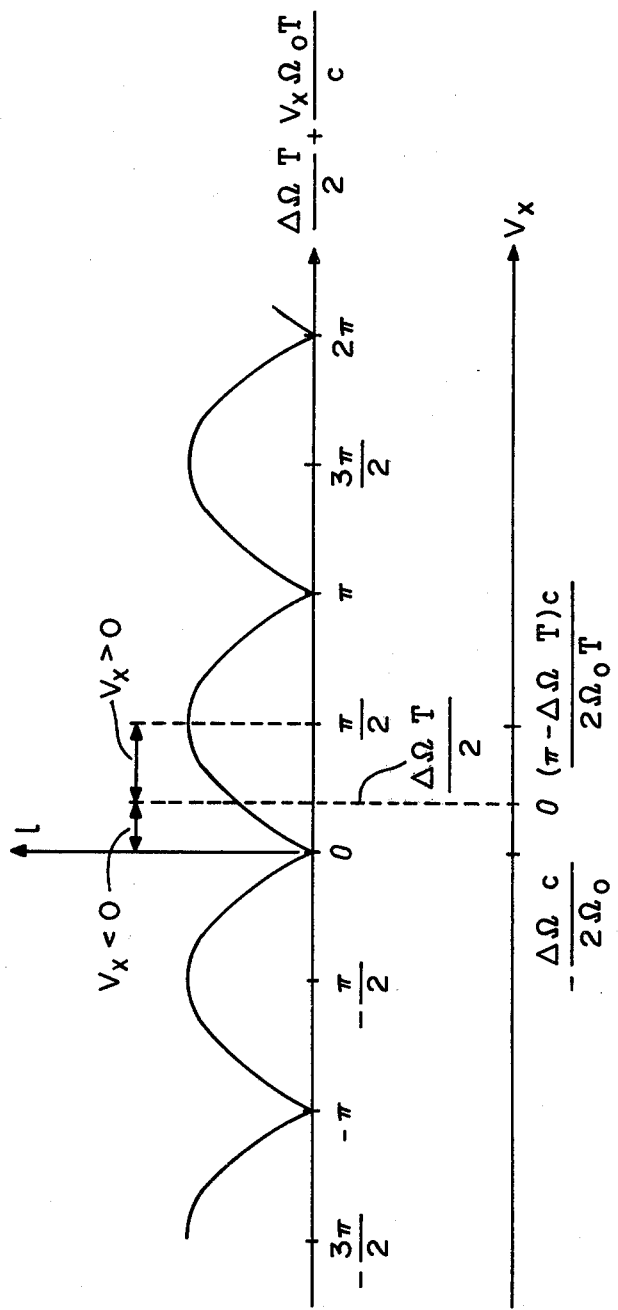
FIG. 10 is a waveform diagram exhibiting a special case of the output signal of the arrangement exhibited in FIGS. 6 and 7.

The output signal $l$ as a function of the velocity $V_x$ is shown for this method in FIG. 10. In the case of velocity components $V_x$ lying between $$-\frac{\Delta\Omega c}{2\Omega_o} \text{ and } \frac{(\pi - \Delta\Omega T)c}{2\Omega_o T},$$

this method gives information containing the magnitude and the direction of $V_x$. This method can thus give the direction of flow without a sign having to be calculated separately.

Equations (29) and (30) show that signals $f$, $g$ and $h$ and $i$ each represent a sine and a cosine of the same angle. We therefore have:

$$2g = \pm \sqrt{1-4f^2}$$

and $$2i = \pm \sqrt{1-4h^2} \tag{47}$$

Consequently, it is necessary e.g. to store only signal $f$ by using a delay line; the lower delay line in FIG. 6 can be simplified so as to transmit only the sign of $g$ or $i$, and $g$ and $i$ can be calculated from equations (47).

Figure 7:
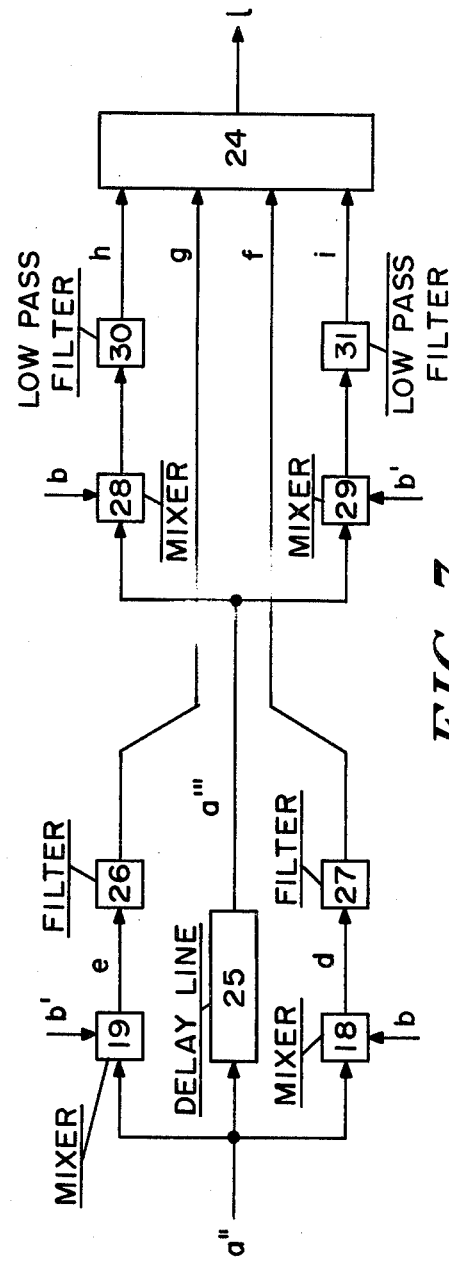
FIG. 7 is a block diagram of a variant of the arrangement exhibited in FIG. 6.

FIG. 7 shows a modification of the apparatus of FIG. 6 using only one delay line 25. In FIG. 7 the signal $a''$ is delayed, the delayed signal $a'''$ is mixed with $b$ and $b'$ in mixers 28 and 29 respectively and the low-frequency components of both products (in this case signals $h$ and $i$) are obtained as the outputs of low-pass filters 30 and 31 respectively.

Figure 11:
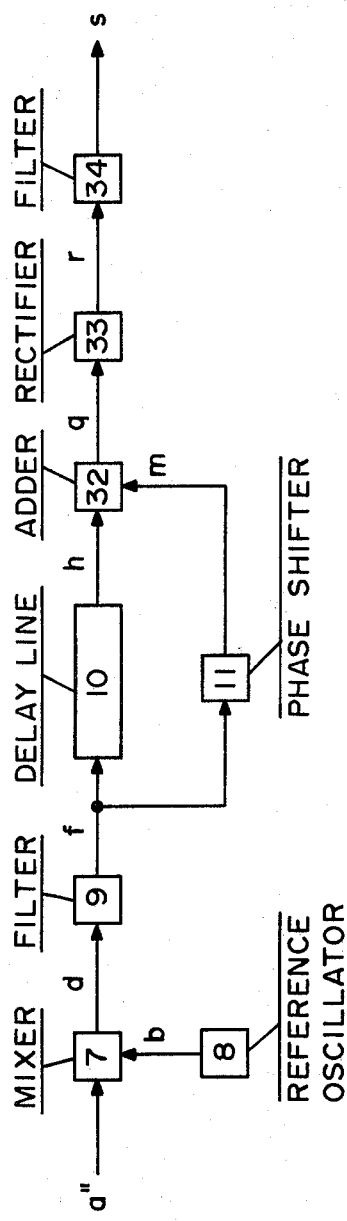
FIG. 11 is a block diagram of a third variant of the arrangement exhibited in FIG. 1.

FIG. 11 shows another modification of the measuring apparatus of FIG. 1. The main difference is that, in FIG. 11, an adder 32 forms the sum of signals $h$ and $m$. The sum signal $q$ is:

$$q = h + m = A \cdot B \tag{48}$$

with $$A = \left\{ \cos \left[ \frac{2(\Omega_o - \Omega_1)t + (\Omega_1 - \Omega_o)T - \Omega_o(T_t + T_r - T)) - \phi}{2} \right] \right\} \tag{48a}$$

and $$B = \left\{ \cos \left[ \frac{(\Omega_1 - \Omega_o)T + \Omega_o(T_t - T_r - T)) + \phi}{2} \right] \right\} \tag{48b}$$

The sum signal $q$ is conveyed to a rectifier 33 whose output signal $r$ is transmitted to a filter 34. The output signal $s$ of filter 34 can be expressed as follows:

$$s = \left| \frac{\cos(\Omega_1 - \Omega_o)T + \Omega_o T_t - T_r - T + \phi}{2} \right| \tag{49}$$

Taking account of equation (16) we can write:

$$s = \left| \cos \left[ \frac{(\Omega_1 - \Omega_o)T}{2} + \frac{\phi}{2} + \frac{\Omega_o T}{c} V_x \right] \right| \tag{50}$$

Figure 12:
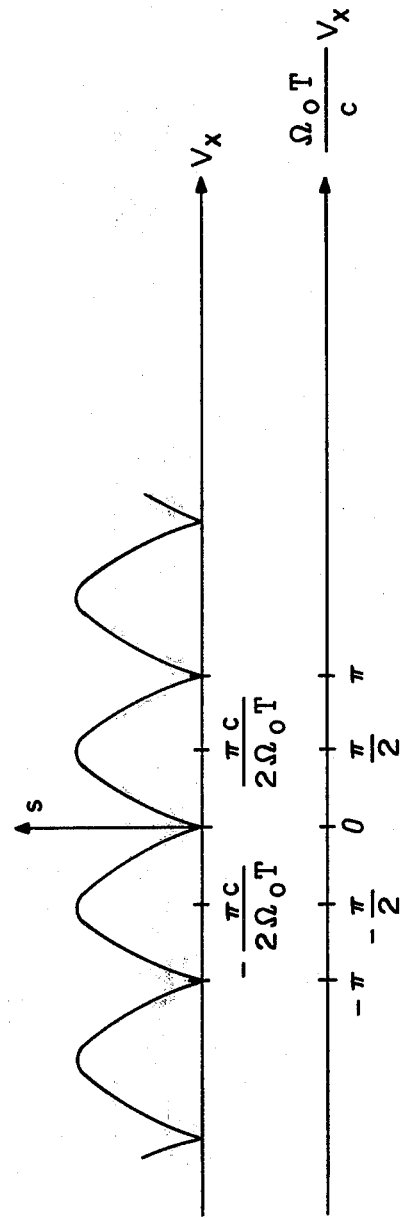
FIG. 12 is a waveform diagram exhibiting a special case of the output signal of the arrangement exhibited in FIG. 11.

If the condition $$\frac{\phi}{2} = \pm \frac{\pi}{2} + 2K\pi \tag{51}$$

with $K$ = an integer $\geq 0$,
is fulfilled, we then obtain the result shown in FIG. 10, i.e., $$s = \left| \sin \left( \frac{\Delta \Omega T}{2} + \frac{\Omega_o T}{c} V_x \right) \right| \tag{52}$$

with $\Delta\Omega = \Omega_1 - \Omega_o$.
If the condition $$\frac{(\Omega_1 - \Omega_o)T}{2} + \frac{\phi}{2} = \pm \frac{\pi}{2} + 2K\pi \tag{53}$$

is fulfilled, we obtain the result shown in FIG. 12, i.e., $$s = \left| \sin \frac{\Omega_o T}{c} V_x \right| \tag{54}$$

In this case, however, we obtain only the magnitude but not the direction (or sign) of the velocity.

Figure 13:
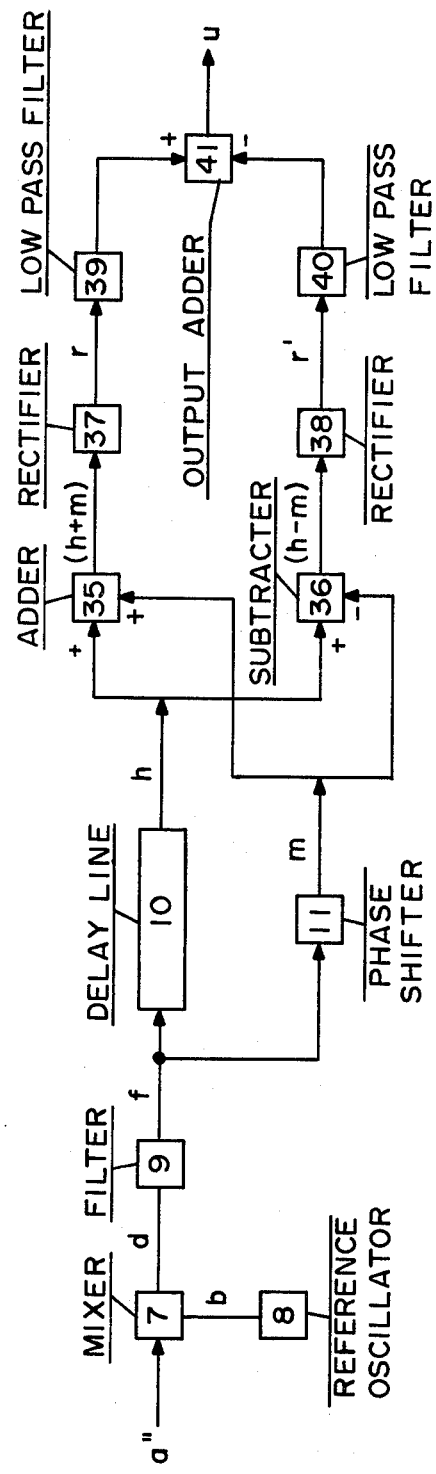
FIG. 13 is a block diagram of a variant of the arrangement exhibited in FIG. 11.

FIG. 13 shows an interesting modification of the apparatus shown in FIG. 11. In FIG. 13, the sum and the difference of the signals $h$ and $m$ are obtained in adders 35 and 36. The resulting signals $(h+m)$ and $(h-m)$ are then rectified by rectifier 37 or 38 and filtered through low-pass filters 39 or 40.

If $h$ and $m$ have given equal amplitudes, the output signals of filters 39 and 40 can be expressed as follows:

$$r = \left| \cos \left[ \frac{(\Omega_1 - \Omega_o)T}{2} + \frac{\phi}{2} + \frac{\Omega_o T}{c} V_x \right] \right| \tag{55}$$

$$r' = \left| \sin \left[ \frac{(\Omega_1 - \Omega_o)T}{2} + \frac{\phi}{2} + \frac{\Omega_o T}{c} V_x \right] \right| \tag{56}$$

The output adder 41 forms the difference signal:

$$u = r - r' \tag{57}$$

Figure 14:
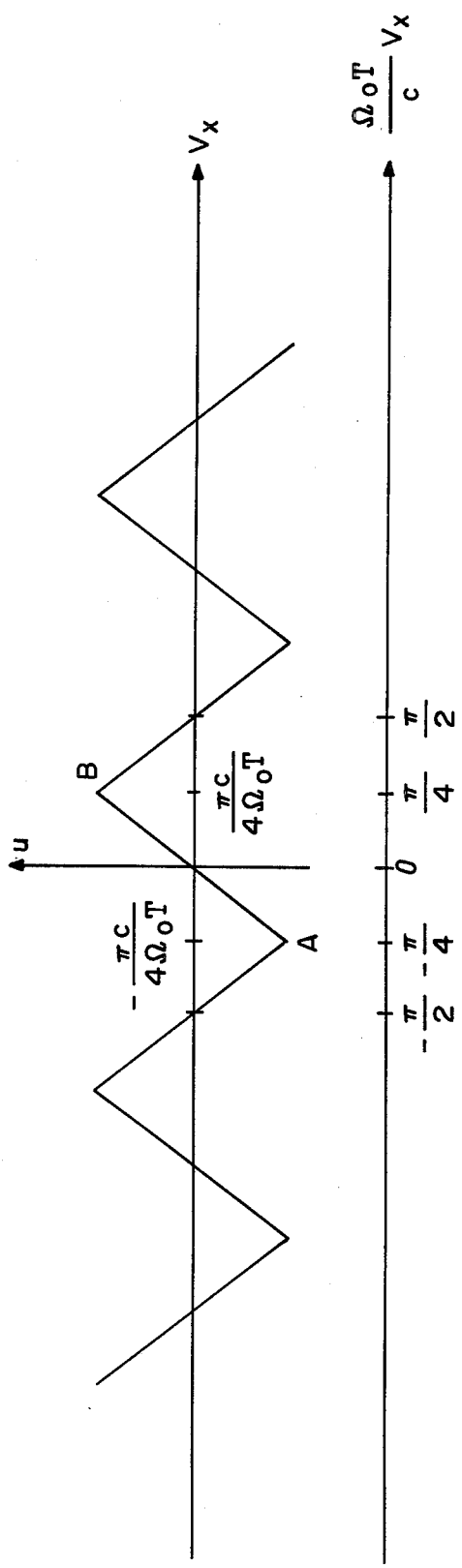
FIG. 14 is a waveform diagram exhibiting a special case of the output signal of the arrangement exhibited in FIG. 13.

FIG. 14 shows the signal $u$ as a function of $V_x$ in cases when the condition set out in equation (53) is fulfilled. Although the segments of this diagram, e.g. AB, have great linearity, they are strictly speaking segments of a sine function.

The apparatus of FIG. 13 can also be used to perform a method embodying the invention when $h$ and $m$ have different amplitudes, in which case the output signal needs to be represented by a different function.

Methods in which the signal bearing information relating to the velocity is obtained by summing two other signals will herein be briefly called "additive methods".

All the aforementioned modifications and special cases of the multiplicative methods can also be applied to the additive methods.

In the aforementioned methods, an intermediate frequency $(\Omega_1 - \Omega_o)$ is frequently used. We therefore think it worth giving a few guidelines for determining this intermediate frequency.

All the aforementioned methods use a pulsed ultrasonics source. For the sake of simplicity, the pulsed nature of the received echo signals have not been shown in the preceding calculations. Since the ultrasonic pulses are very short, the received spectrum is fairly wide. For example, if the pulses have a duration of 0.5 $\mu$s, the received spectrum has a width of approximately 2 MHz. It can be shown that, on account of this widening of the received echo spectrum, the intermediate frequency (i.e the frequency of signal $f$ in our examples) must not be less than half the bandwidth of this spectrum. This condition must be fulfilled if the total information regarding velocity (obtained by using the Doppler effect) is to have a single value in the phase of signal $f$.

If it is desired to operate with an intermediate frequency less than the aforementioned limiting frequency, we must use two projections of the phase on to two axes of the phasor plane. This is done e.g. in the method described in connection with the apparatus of FIG. 6. In this case the echo signals are demodulated at a frequency $\Omega_1 = \Omega_o$, i.e. the intermediate frequency is equal to zero, but modulation is performed with two signals phase-shifted by $\pi/2$ relative to one another, so that two projections of the different vectors are still obtained and the phase information remains intact.

The following alterations and improvements can be made to the method and apparatus described hereinbefore.

In the apparatus of FIG. 1, limiter 6 can be replaced by an automatically-adjusted amplifier.

In the apparatus of FIGS. 11 and 13, rectification could be replaced by other non-linear operations, e.g. by raising to the second power.

In the additive methods, use can be made of other linear combinations of delayed and non-delayed signals.

In the aforementioned apparatus (FIGS. 1, 4, 11 and 13) phase-shifter 11 can be replaced by a mixer and a filter. The mixer forms the product of the signal $a''$ and a second reference signal $b'$ which has the same frequency as $b$ and is phase-shifted by $\phi$ relative to $b$. The filter transmits one of the frequency bands obtained by mixing. The filter output signal can then replace the output signal of phase-shifter 11.

The phase shift $\phi$, if not equal to zero, can also be obtained without using phase-shifter 11. It is merely necessary to use a delay line 10 having a delay time differing slightly from the pulse repetition period. For example, a phase shift of $\pm \pi/2$ can be obtained if the conditions $$T' = T \pm T''/4 \qquad (58)$$

and $$(\Omega_1 - \Omega_o)T = 2K\pi \qquad (59)$$

are fulfilled, where:
$T'$ = delay time of line 10,
$T$ = repetition period of ultrasonic pulses, and
$T''$ = period of intermediate frequency used $$= \frac{2\pi}{|\Omega_o - \Omega_1|} \qquad (59a)$$

In all the aforementioned apparatus, the echo signals can be amplified but not limited. In the case of the vector-product method, the signal received at the adder output would be proportional not only the velocity $Vx$ but also to $|\vec{D}|^2$:

$$P \text{ without limiter } \alpha \left|\vec{D}(t)\right| \cdot \left|\vec{D}(t-\tau)\right| \left|\sin \frac{2V_x T\Omega}{c}\right| =$$

$$\approx \left|\vec{D}\right|^2 \cdot \left|\sin \frac{2V_x T\Omega}{c}\right| \qquad (60)$$

It is therefore necessary to construct an additional system for dividing the result of the vector product by $|\vec{D}|^2$.

In the case where the amplitude of the velocity is calculated from equation (46) the result of the difference $|\vec{D}(t) - \vec{D}(t-T)|$ must also be divided by $|\vec{D}|$.

All the aforementioned operations (adding, mixing, multiplication, filtering, delay, etc.) can be performed by analog, digital or hybrid circuits.

The signals can be delayed by a variety of methods. For example the signals can be stored in digital form in a shift register and subsequently read off. They can be stored on magnetic stores, semiconductor write-in and read-out stores (random access memory), digital bucket-chain stores (bucket-brigade delay line) or a digital ultrasonic delay line. The delay may also be analog, e.g. using an analog bucket-chain store or an ultrasonic delay line. The method described in connection with the apparatus of FIG. 4 may also be performed using a particularly simple digital device.

The linearity of the methods described here can be improved by using a number of delay lines connected in series ("multi-pulse canceller"). The well-known methods of digital filter technique can be used to construct a multi-delay line system (see e.g. H. Urkowitz: "Analysis and Synthesis of Delay Line Periodic Filters", IRE Trans on Circuit Theory, Volume CT-4, 41–53, June 1957).

Alternatively, a two-part measuring apparatus can be constructed. The first part will separate the echos returned by movable reflectors from echos reflected by stationary objects, by forming the difference between the echo signals of successive transmitted pulses. This process yields only signals corresponding to the echo signals of moving points. The second part can comprise one of the aforementioned apparatus, which will determine the velocity $Vx$ from the signals delivered by the first part. This method is advantageous in cases where echoes may be received from stationary objects and interfere with the measurements.

In the preceding description, the scattering centres have been represented by points, but strictly speaking they are regions containing a variable number of moving scattering centres. Consequently, the received reflected waves show not only a single Doppler frequency representing the speed of one of these regions, but a number of other Doppler frequencies which represent the motion of the scattering centres contained in the region and appear as interfering signals which make it more difficult to recognize a velocity profile when obtained. If the variations in the profile during a number of measurements can be neglected, the signal-to noise ratio of the signal bearing the velocity information can be improved if average point velocity values are calculated from a number of measurements, using a suitable computer unit, and thus obtaining a clear profile.

A simple additional computer (analog or digital) can be used to calculate the rate of flow from the velocity profile in addition to measuring velocity profiles in fluids. Consequently, a device of the aforementioned kind can be supplemented and used as a flowmeter.

Of course, methods embodying the invention can be performed not only with uhrasonic waves but also with audible sound waves or electromagnetic waves. One example is the measurement of the instantaneous wind velocity which can be made with Doppler laser devices. if light waves are used, we may have $$\Omega_o = 2\pi \cdot f_L \qquad (61)$$

where $f_L$ = the frequency of light, or $$\Omega_o = 2\pi \cdot f_m \tag{62}$$

where $f_m$ is a modulation frequency less than $f$. The method is much simpler to carry out with $\Omega_o = 2\pi f_m$ than with $\Omega_o = 2\pi f_L$.

The range of application of the invention extends to all applications for measuring the spatial distribution of the instantaneous velocity of a fluid and/or the quantity of flow thereof. Medical applications are particularly important, since measurements of velocity profiles and rates of flow can be used inter alia to observe and judge the functioning of the heart, the state of important vessels and the functioning of artificial heart valves.

In previously known apparatus a complete measuring system has been required for each point on the calculated velocity curve, but in the apparatus according to the invention a single measuring system is sufficient to determine an entire profile, the number of calculated point speeds per profile being dependent on the storage capacity of the delay lines used. The time required is reduced in that an entire profile can be obtained using only two wave pulses. In contrast to the conventional Doppler process (counting of zero passages, where $\Delta t_{min} \approx 1/\Delta f$) the minimum time required per measurement $\Delta t_{min}$ is not limited by the Doppler frequency deviation $\Delta f$. Consequently, the main advantages of the invention are that the apparatus and the time required per measurement are considerably reduced.

What is claimed is:

1. A method of measuring a velocity profile of a flowing fluid which carries wave-scattering zones by irradiating the fluid with pulsed waves along an irradiation path and receiving echo waves reflected by the wave-scattering zones, which method is characterized in that the determination of each point of the velocity profile comprises measuring a transit time difference between a first and a second echo wave, which first and second echo waves are produced by reflection of a first and a second wave pulse respectively by substantially one and the same wave-scattering zone, said first and second wave pulses being emitted by the same source.

2. A method according to claim 1 wherein the measurement of the transit time difference includes deriving from each of the echo waves at least one signal which carries the phase information of the echo wave, and processing the derived signals to generate a signal representative of the transit time difference.

3. A method according to claim 2 wherein the derivation of the signal which carries the phase information of the echo wave includes converting each echo wave into an electrical signal, mixing the electrical signal with at least one reference signal to generate an output, and filtering out a preselected frequency component of said output.

4. A method according to claim 3 including mixing the electrical signal with two reference signals which have the same frequency and between which there is a constant phase difference.

5. A method according to claim 2 wherein the derivation of the signal which carries the phase information of the echo wave includes converting each echo wave into an electrical signal, delaying the electrical signal over a time interval which is approximately equal to the time interval between the first and the second emitted wave pulses, mixing the delayed electrical signal with at least one reference signal to generate an output, and filtering out a preselected frequency component of said output.

6. A method according to claim 5 including mixing the delayed electrical signal with two reference signals which have the same frequency and between which there is a constant phase difference.

7. A method according to claim 2 wherein the processing of the signals derived from the echo waves includes delaying the signal derived from the first echo wave over a time interval which is approximately equal to the time interval between the first and the second emitted wave pulses, forming the product of the delayed signal derived from the first echo wave by the signal derived from the second echo wave, and filtering out a preselected frequency component of the product.

8. A method according to claim 2 wherein said processing of the signals derived from the echo waves includes delaying the signal derived from the first echo wave over a time interval which is approximately equal to the time interval between the first and the second emitted wave pulses, and forming a signal representative of a linear function of the delayed signal derived from the first echo wave and the signal derived from the second echo wave, and filtering out a preselected frequency component of the formed signal.

9. A method according to claim 8 including performing a nonlinear operation of the formed signal to modify its wave shape.

10. A method according to claim 2 wherein said processing of the signals derived from the echo waves includes shifting the phase of a derived signal a predetermined amount.

11. A method according to claim 2 wherein said processing of the signals derived from the echo waves includes shaping the derived signals into square waves.

12. A method according to claim 2 wherein said processing of the signals derived from the echo waves includes delaying the signal derived from the first echo wave over a time interval which is approximately equal to the time interval between the first and the second emitted wave pulses, forming the sum and the difference of the delayed signal derived from the first echo wave and the signal derived from the second echo wave, modifying the wave shape of both the sum and difference signals by performing a nonlinear operation thereon, filtering out the low-frequency components of the signals resulting therefrom and forming the difference between said low-frequency components.

13. A method according to claim 1 wherein the measurement of the transit time difference includes:
converting each echo wave into an electrical signal;
mixing the electrical signal with two reference signals which have the same frequency and between which there is a constant phase difference;
filtering out a preselected frequency component of each signal resulting from said mixing to form a signal pair;
delaying the signal pair derived from the first echo wave over an interval which is approximately equal to the time interval between the first and the second emitted wave pulses; and
defining a first vector with the delayed signal pair derived from the first echo wave, defining a second vector with the signal pair derived from the second echo wave, and computing the velocity value at a point of the velocity profile from said first and second vectors.

14. A method according to claim 1 wherein the measurement of the transit time difference comprises:
converting each echo wave into an electrical signal, delaying the electrical signal derived from the first echo wave over an interval which is approximately equal to the time interval between the first and the second emitted wave pulses;
mixing the delayed electrical signal derived from the first echo wave with two reference signals which have the same frequency and between which there is a constant phase difference;
filtering out one frequency component of each signal resulting from said mixing to form a first signal pair;
mixing the electrical signal derived from the second echo wave with the two reference signals;
filtering out one frequency component of each signal resulting from said mixing to form a second signal pair;
defining a first vector with the first signal pair;
defining a second vector with the second signal pair; and
computing the velocity value at a point of the velocity profile by using said first and second vectors.

15. A method according to claim 1 wherein the measurement of the transit time difference includes determining average values for each point of the velocity profile.

16. A method according to claim 1 wherein the fluid is irradiated with pulsed ultrasonic waves.

17. Apparatus for measuring a velocity profile of a flowing fluid which carries wave-scattering zones, comprising a transmitter for irradiating the fluid with pulsed waves along an irradiation path, a receiver for receiving echo waves from the wave-scattering zones and deriving echo signals representative of said echo waves, and means connected with the receiver for measuring a transit time difference between a first and a second echo wave produced by reflection of a first and a second wave pulse by substantially one and the same wave-scattering zone, said first and second wave pulses being emitted by the same source.

18. Apparatus according to claim 17 wherein the means for measuring the transit time difference includes first circuit means connected from the receiver for deriving output signals which carry the phase information of the echo waves, delay means connected from said first circuit means for delaying the output signals of the first circuit means over a time interval which is approximately equal to the time interval between the first and second emitted wave pulses, and second circuit means for processing the output of the delay means corresponding to the first echo wave and the output of the first circuit means corresponding to the second echo wave to generate a signal representative of the transit time difference.

19. Apparatus according to claim 18 wherein the first circuit means includes a signal generator for supplying a reference signal, a mixer connected from the receiver and from the signal generator for mixing the echo signals with the reference signal, and a filter connected from the mixer for filtering out one of the frequency components produced by mixing to supply the output signal of the first circuit means.

20. Apparatus according to claim 18 wherein the second circuit means includes multiplier means connected from the first circuit means and from the output of the delay means for forming the product of an output signal of the delay means which corresponds to the first echo wave by an output signal of the first circuit means which corresponds to the second echo wave, and a filter connected from the multiplier means for filtering out a frequency component of the product, said component being representative of the transit time difference.

21. Apparatus according to claim 18 wherein the second circuit means includes third circuit means connected from the delay means and from the first circuit means for forming an output signal representative of a linear function of an output signal of the delay means which corresponds to the first echo wave and an output signal of the first circuit means which corresponds to the second echo wave, rectifier means for rectifying the output of the third circuit means, and a filter connected from the rectifier means for filtering out a frequency component of the output signals from the rectifier, said component being representative of the transit time difference.

22. Apparatus according to claim 17 wherein the means for measuring the transit time difference includes first circuit means connected from the receiver for deriving a first output signal pair which carries the phase information of the first echo wave and a second output signal pair which carries the phase information of the second echo wave, and second circuit means for processing the output signals of the first circuit means to generate a signal representative of the transit time difference.

23. Apparatus according to claim 22 wherein the first circuit means includes mixer means connected from the receiver and from a signal generator for mixing the echo signals with two reference signals which have the same frequency and between which there is a constant phase difference to generate the second pair of output signals, and delay means connected from the mixer means for delaying the pair of output signals over a time interval which is approximately equal to the time interval between the first and second emitted wave pulses to generate the first pair of output signals.

24. Apparatus according to claim 22 wherein the first circuit means includes:
first mixer means connected from the receiver and from a signal generator for mixing the echo signals with two reference signals which have the same frequency and between which there is a constant phase difference to generate the second pair of output signals;
delay means connected from the receiver for delaying the echo signals over a time interval which is approximately equal to the time interval between the first and second emitted wave pulses; and
second mixer means connected from the delay means and from the signal generator for mixing each delayed echo signal with said two reference signals to generate the first pair of output signals.

25. Apparatus according to claim 22 wherein the second circuit means includes computer means for calculating each point of the velocity profile by operating with a first vector defined by the first signal pair and a second vector defined by the second signal pair to generate a signal representative of the transit time difference.

26. Apparatus according to claim 17 wherein the means for measuring the transit time difference comprises means for determining, for each point of the velocity profile, average values of the measured transit time difference.

27. Apparatus according to claim 17 wherein the transmitter irradiates the fluid with pulsed ultrasonic waves.

* * * * *